April 6, 1948.  J. W. KING ET AL  2,439,364
CLAMP
Filed March 12, 1947

INVENTORS.
JOHN W. KING
JAMES J. McNAMEE
BY Geo. B. Pitts
ATTORNEY.

Patented Apr. 6, 1948

2,439,364

UNITED STATES PATENT OFFICE 2,439,364

CLAMP

John W. King and James J. McNamee, Cleveland, Ohio, assignors to Miles Park Machine & Tool, Inc., Cleveland, Ohio, a corporation of Ohio Application March 12, 1947, Serial No. 734,152

2 Claims. (Cl. 85—3)

1

This invention relates to a clamp consisting of a bolt and an anchor member movably associated therewith and capable of being related to the bolt, to permit the bolt and anchor member to be readily projected through alined openings of two or more parts to be secured together and the latter positioned against the inner part to form an anchor, whereby the nut for the bolt or head thereof may be turned to effect a clamping of the parts.

While the clamp may be employed in various applications, we have found that at a great saving of time and expense the clamp is especially adapted to the assembly and securing of fenders to the wheel housings or the bodies of automobiles and repairs to the latter where the fenders have to be replaced, particularly where the body wall adjacent to the wheel housing or fender is so shaped that access thereto is difficult or impossible. In the assembly of bodies and fenders it has been the practice, according to our knowledge, to weld on the inner side of the body a plurality of nuts into which bolts could be screwed in assembling a fender therewith; and where a housing had to be repaired or the fender had to be replaced it was necessary to remove the upholstery, which, as experience has demonstrated, cannot be satisfactorily replaced.

One object of the invention is to provide an improved clamp of the type referred to wherein the anchor member is shaped to accommodate the bolt with locked engagement with either its head or a nut thereon, whereby the clamp adapts itself to various arrangements and shapes of the parts to be clamped.

Another object of the invention is to provide an improved clamp of this type wherein the anchor member is shaped to permit it and the bolt to be projected through relatively small openings, to accommodate the bolt with either its head or a nut thereon in locked engagement with the anchor member, prevent relative endwise movement between the bolt and anchor member while being positioned and hold the bolt or nut during the clamping of parts together.

Another object of the invention is to provide an improved clamp of this type the parts of which when clamped to secure walls together exert pressure on one side of the nut to effect a locking relation with the bolt.

Other objects of the invention will be apparent to those skilled in the art to which our invention relates from the following description taken in connection with the accompanying drawing, wherein

2

Figure 1:
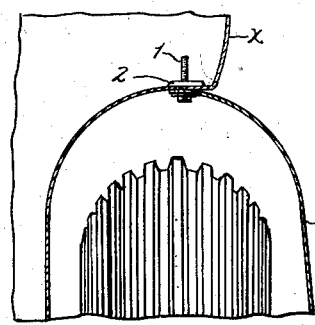
Fig. 1 is a fragmentary sectional view of a vehicle body side wall and wheel housing secured together by a clamp embodying our invention.

In the drawing, 1 indicates a bolt, 2 indicates an anchor member, 3 indicates a washer and 4 indicates a nut, which parts, in assembled relation, may be projected through alined openings of two or more walls and the nut 4 or bolt 1 then rotated to clamp the walls together, as shown in Figs. 1, 4, 8 and 9. The bolt shank 1a extends through openings in the washer 3 and anchor member 2 and the nut 4 is screwed on the outer end portion of the shank 1a, so that all of the parts are related in advance of being positioned and clamped.

Figure 7:
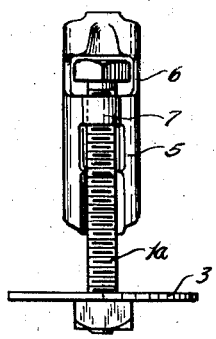
Fig. 7 is a view similar to Fig. 2 but showing the bolt reversed in the anchor member.
Figure 9:
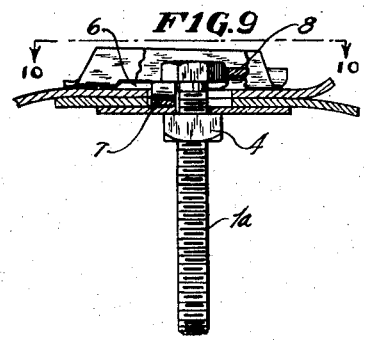
Fig. 9 is a sectional view of parts shown in Fig. 8, enlarged.
Figure 10:
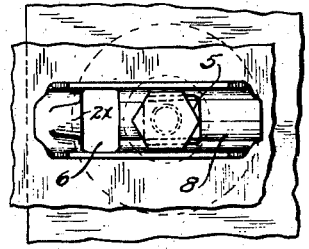
Fig. 10 is a section on the line 10—10 of Fig. 9.

As will later be apparent and as shown in the drawing, the shank 1a may be reversed in the anchor member to position either the bolt head 1b or nut 4 therein. Accordingly, when the bolt 1 is positioned as shown in Figs. 2, 2a, 3 and 4, the nut 4 serves as an abutment element for the anchor member 2 and when the bolt 1 is positioned as shown in Figs. 7, 9 and 10, the head 1b serves as an abutment for the anchor member 2. The anchor member 2 is formed from a section of relatively thin sheet metal and shaped to provide a nested locked relation with the bolt shank and its head or nut when these parts are being projected through openings of the walls a, b, to be clamped and lock the bolt or nut against turning during clamping of the walls. The anchor member 2 consists of a back wall 2a and side walls 2b, disposed at substantially right angles thereto. Between its opposite ends, the back wall 2a is formed with an opening 5 elongated longitudinally thereof. The bolt shank 1a extends through the opening 5. The opening 5 is slightly wider than the outside diameter of the bolt shank 1a so that the bolt 1 and anchor member 2 may freely swing or rock one relative to the other, but is of less width than the back 2a between the side walls 2b to provide a seat 2a' for the bolt head 1b or nut 4 during clamping of the walls a, b, as later set forth. 6 indicates a separate opening formed in the back 2 and having a width slightly greater than that of the head 1b and nut 4. The back 2a between the openings 5, 6, is transversely arcuately embossed outwardly, as shown at 7, that is, in the direction opposite to that in which the side walls 2b extend and that portion of the back 2a extending outwardly of the opening 5 is transversely arcuately embossed inwardly, as shown at 8; also, that portion of the back 2a extending outwardly from the opening 6 is embossed inwardly to form an abutment or stop 2x for shank 1a and bolt head 1b or nut 4 and prevent relative endwise movement between the bolt 1 and anchor member 2 when these parts are being projected through openings preliminary to clamping the walls together.

Figure 3:
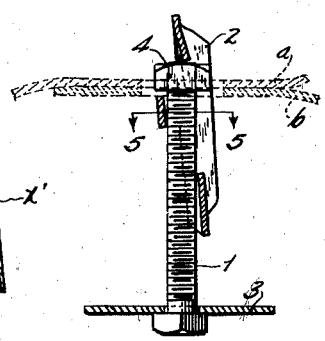
Fig. 3 is a section on the line 3—3 of Fig. 2 and showing the operation of projecting the part through alined openings of walls to be secured together.
Figure 2:
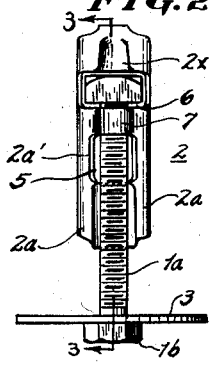
Fig. 2 is an elevational view of the clamp with the bolt shank and nut positioned in the anchor member.
Figure 4:
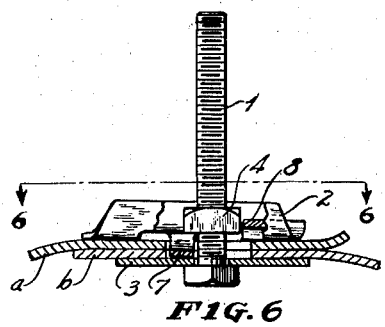
Fig. 4 is a view showing the position of the parts after the walls have been secured together; this view being similar to Fig. 1, enlarged.
Figure 2A:
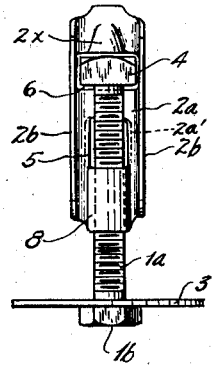
Fig. 2a is a view similar to Fig. 2, but looking at the reverse side of the parts.
Figure 5:
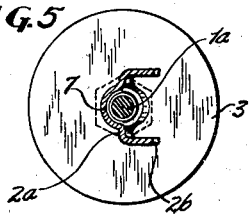
Fig. 5 is a section on the line 5—5 of Fig. 3.
Figure 6:
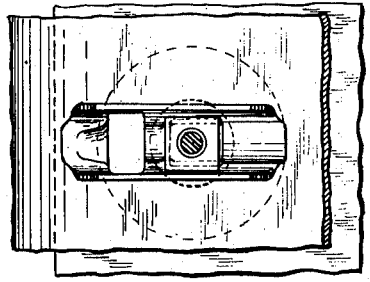
Fig. 6 is a section on the line 6—6 of Fig. 4.

As shown in Figs. 2, 2a and 3, the embossed walls 7, 8, spacedly engage diametrical sides of the bolt shank 1a, and the opening 6 accommodates the nut 4, to permit the bolt 1 and anchor member 2 to be disposed in nested relation while being projected through alined openings, as shown in Fig. 3. After the anchor member 2 and adjacent portion of the bolt 1 have been projected through the alined openings of the walls a, b, the bolt 1 may be jiggled or slightly tapped, the effect of which will cause the anchor member 2 to swing or rock on the bolt shank 1a and by moving the bolt 1 endwise outwardly the anchor member 2 will engage the wall a, with the nut 4 between and engaging the side walls 2b and the seat 2a', so that the bolt 1 can be turned and effect clamping of the walls a, b, as shown in Fig. 4.

It will be noted that the side walls 2b and embossed walls 7, 8, serve to reinforce the anchor member 2 to withstand the pressure resulting from tightening the bolt and nut. It will also be noted that where the combined thickness of the walls a, b, is less than the lateral displacement of the embossment 7, the latter engages the washer 3 and that the end of the anchor member 2 on the remote side of the bolt 1 engages the wall a, so that the anchor member 2 is disposed in slightly non-parallel relation to the wall a; accordingly, when the bolt 1 and nut 4 are tightened, the anchor member 2 tends to disaline or displace the axial relation between the nut and bolt and thus effect a locking relation therebetween and lessen or eliminate the danger of these parts becoming loose.

Fig. 1 shows the side wall x of a vehicle side wall and wheel housing and fender x' secured in rigid relation by a clamp constructed as above set forth. When found desirable, the end of the bolt 1 above the anchor member 2 may be cut off.

Figure 8:
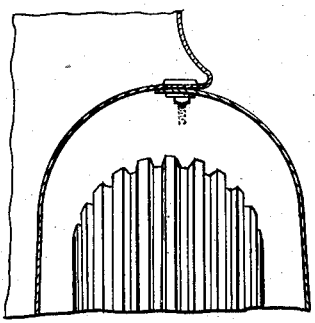
Fig. 8 is a fragmentary section showing the clamp securing a wheel housing to the body wall where the latter is shaped to prevent access thereto.

Fig. 7 shows the bolt 1 reversed in the anchor member 2, the bolt head 1b being seated in the opening 6 and when the bolt and nut are tightened the bolt 1 is held against turning due to the engagement of the head 1b with the side walls 2b (see Fig. 10). With the bolt 1 and anchor member 2 assembled as shown in Fig. 7, they may be projected through the openings formed in the walls to be clamped similarly to that shown in Fig. 3 and then clamped as shown in Fig. 9. When the parts are assembled in this manner, the nut 4 being accessible and the bolt being held against turning, the clamp is adapted to meet various conditions, as where the opening in one wall is inaccessible, as shown in Fig. 8 or in the repair and replacement of vehicle bodies or fenders to avoid removal of upholstery or interior fixtures, surfacing material and the like.

To those skilled in the art to which our invention relates many changes in construction and widely differing embodiments and applications thereof will be apparent without departing from the scope of the invention. The description and disclosures herein are purely illustrative and not intended to be in any sense limiting.

What we claim is:

1. A clamp for clamping walls together consisting of a bolt having a head and a screw threaded shank, a nut on said shank, said head and nut being arranged to operate as abutment elements, a washer through which the shank extends and an anchor member shaped to provide a back and laterally extending side walls spaced to engage the opposite sides of either of said elements, the back being formed with an opening through which said shank loosely extends elongated longitudinally of the back and providing at its opposite sides a seat for either of said elements and a separate transversely elongated opening extending between said side walls, said back between said openings being transversely embossed arcuately in a direction opposite to said side walls and said back between the remote end of said elongated opening and the adjacent end of said back being transversely embossed arcuately in the direction of said side walls, said bolt and said anchor member being freely swingable one relative to the other to nest the bolt in said arcuate embossments with the adjacent abutment element in said separate opening when the shank and anchor member are to be projected through openings in the walls to be clamped.

2. A clamp as claimed in claim 1 wherein the back of said anchor member adjacent the outer side of said separate opening is embossed laterally in the direction of said side walls to provide a stop for the element in said opening.

JOHN W. KING.
JAMES J. McNAMEE.

REFERENCES CITED

The following references are of record in the file of this patent:

UNITED STATES PATENTS

| Number | Name | Date |
| --- | --- | --- |
| 571,096 | Phillips | Nov. 10, 1896 |
| 870,820 | Ellis | Nov. 12, 1907 |
| 978,380 | Kennedy | Dec. 13, 1910 |
| 1,035,399 | Wheeler | Aug. 13, 1912 |
| 1,694,494 | Thomkinson | Dec. 11, 1928 |